US011340811B2

(12) United States Patent
Zhu et al.

(10) Patent No.: US 11,340,811 B2
(45) Date of Patent: May 24, 2022

(54) DETERMINING RECLAIM INFORMATION FOR A STORAGE BLOCK BASED ON DATA LENGTH AND MATCHING WRITE AND DELETE PARAMETERS

(71) Applicant: EMC IP Holding Company LLC, Hopkinton, MA (US)

(72) Inventors: Julius Zhu, Shanghai (CN); Lu Lei, Shanghai (CN); Ao Sun, Shanghai (CN); Yu Teng, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 112 days.

(21) Appl. No.: 16/829,910

(22) Filed: Mar. 25, 2020

(65) Prior Publication Data

US 2021/0081110 A1 Mar. 18, 2021

(30) Foreign Application Priority Data

Sep. 12, 2019 (CN) .......................... 201910865406.9

(51) Int. Cl.
*G06F 3/06* (2006.01)

(52) U.S. Cl.
CPC ............ *G06F 3/064* (2013.01); *G06F 3/0619* (2013.01); *G06F 3/0652* (2013.01); *G06F 3/0653* (2013.01); *G06F 3/0659* (2013.01); *G06F 3/0673* (2013.01); *G06F 2211/104* (2013.01)

(58) Field of Classification Search
CPC ...... G06F 3/064; G06F 3/0653; G06F 3/0652; G06F 3/0619; G06F 3/0673; G06F 3/0659; G06F 2211/104; G06F 3/0679; G06F 3/061
USPC .................. 711/159, 154; 707/813, 693, 816
See application file for complete search history.

(56) References Cited

U.S. PATENT DOCUMENTS

| 2007/0030734 | A1* | 2/2007 | Sinclair ................. G06F 3/0613 365/185.11 |
| 2018/0113804 | A1* | 4/2018 | Hsu ..................... G06F 12/0253 |
| 2020/0104054 | A1* | 4/2020 | Lei .......................... G06F 11/07 |
| 2020/0104069 | A1* | 4/2020 | Zhu ........................ G06F 3/0604 |
| 2020/0142880 | A1* | 5/2020 | Sun ......................... G06F 16/13 |
| 2020/0233580 | A1* | 7/2020 | Lei ......................... G06F 3/0611 |

* cited by examiner

*Primary Examiner* — Hong C Kim
(74) *Attorney, Agent, or Firm* — Amin, Turocy & Watson, LLP

(57) ABSTRACT

Storage blocks are managed. For instance, a set of write parameters and a set of deletion parameters are obtained related to a target storage block. In response to the set of write parameters matching the set of deletion parameters, a first data length is obtained for the target storage block, the first data length being determined in response to receiving a write request for the target storage block. Further, reclaim information is determined related to the target storage block based on the first data length and the set of deletion parameters. It is thus possible to reduce times of scanning the entire object table to determine whether there is an object referring to the storage block, thereby reducing the time consumed by the verification process and improving the reclaiming speed of storage blocks.

20 Claims, 5 Drawing Sheets

DETERMINING RECLAIM INFORMATION FOR A STORAGE BLOCK BASED ON DATA LENGTH AND MATCHING WRITE AND DELETE PARAMETERS

RELATED APPLICATION

The present application claims the benefit of priority to Chinese Patent Application No. 201910865406.9, filed on Sep. 12, 2019, which application is hereby incorporated into the present application by reference herein in its entirety.

FIELD

Embodiments of the present disclosure relate to the field of storage, and specifically to a method, device and computer program product for managing storage blocks.

BACKGROUND

Storage systems, such as Elastic Cloud Storage (ECS) system, may use storage blocks (e.g., chunks) to store data. All user data are stored in the storage blocks instead of a file system, and they are transparent to the underlying hardware, and the storage blocks are shared. An object usually includes a group of data blocks that are stored in different chunks and a storage block may contain data blocks of multiple objects. In a storage system, it is possible to manage disk capacity through storage blocks and store data on storage blocks in an append-only manner. The storage system may make user data transparent to the underlying disks and file system, and may easily consider a distributed system to achieve data consistency. However, there are still many issues to be addressed in the storage system that uses storage blocks.

SUMMARY

Embodiments of the present disclosure provide a method, device and computer program product for managing storage blocks.

According to a first aspect of the disclosure, there is provided a method of managing storage blocks. The method comprises obtaining a set of write parameters and a set of deletion parameters related to a target storage block, the set of write parameters comprising information related to data that is stored in the target storage block and associated with at least one object, and the set of deletion parameters comprising information related to data that is deleted from the target storage block and associated with the at least one object. The method further comprises in response to the set of write parameters matching the set of deletion parameters, obtaining a first data length for the target storage block, the first data length being determined in response to receiving a write request for the target storage block. The method further comprises determining reclaim information related to the target storage block based on the first data length and the set of deletion parameters.

According to a second aspect of the present disclosure, there is provided an electronic device. The electronic device comprises a processor; and a memory having computer program instructions stored thereon, the processor executing the computer program instructions in the memory to control the electronic device to perform acts comprising: obtaining a set of write parameters and a set of deletion parameters related to a target storage block, the set of write parameters comprising information related to data that is stored in the target storage block and associated with at least one object, and the set of deletion parameters comprising information related to data that is deleted from the target storage block and associated with the at least one object; in response to the set of write parameters matching the set of deletion parameters, obtaining a first data length for the target storage block, the first data length being determined in response to receiving a write request for the target storage block; and determining reclaim information related to the target storage block based on the first data length and the set of deletion parameters.

According to a third aspect of the present disclosure, there is provided a computer program product being tangibly stored on a non-volatile computer-readable medium and comprising machine-executable instructions which, when executed, cause a machine to perform steps of the method according to the first aspect of the present disclosure.

BRIEF DESCRIPTION OF THE DRAWINGS

The above and other features, advantages and aspects of embodiments of the present disclosure will be made more apparent by describing exemplary embodiments of the present disclosure in more detail with reference to figures. In the exemplary embodiments of the present disclosure, the same reference signs usually represent the same element, wherein.

In all figures, the same or corresponding reference signs represent the same or corresponding parts.

DETAILED DESCRIPTION OF EMBODIMENTS

Figure 1:
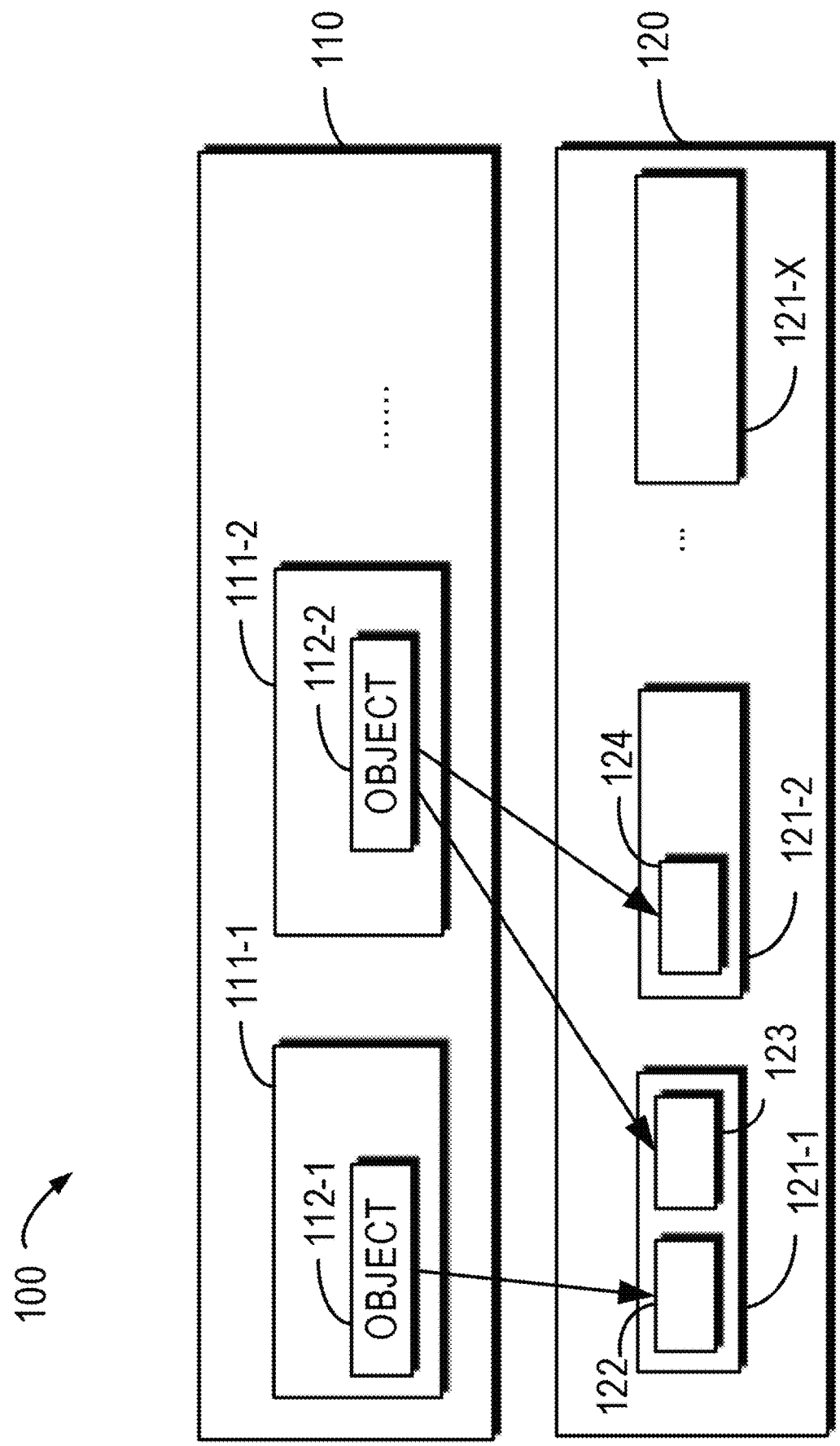
FIG. 1 illustrates a schematic diagram of a storage system 100 in which devices and/or methods according to embodiments of the present disclosure may be implemented.

Embodiments of the present disclosure will be described below in more detail with reference to the drawings. Although some various embodiments of the present disclosure are shown in the drawings, it should be appreciated that the present disclosure may be implemented in various forms and should not be limited by embodiments stated herein. On the contrary, these embodiments are provided to enable more thorough and complete understanding of the present disclosure. It should be appreciated that drawings and embodiments of the present disclosure are only used for exemplary purposes and not to limit the scope of protection of the present disclosure.

As described in embodiments of the present disclosure, the terms "includes", "comprises" or like terms should be understood as open-ended terms that mean "includes, but is not limited to." The term "based on" is to be read as "based at least in part on." The term "an embodiment" or "the embodiment" should be understood as "at least one embodiment". The terms "first", "second", etc. may refer to different or the same objects. Other explicit and implicit definitions might be included below.

The principles of the present disclosure are described below with reference to several exemplary embodiments illustrated in the drawings. Although various embodiments have been shown in the drawings, it should be understood that these embodiments are only intended to enable those skilled in the art to better understand and thereby implement the present disclosure and not to limit the scope of the present disclosure in any manner.

A storage system (for example, the Elastic Cloud Storage ECS System) stores all user data in fixed-size storage blocks (for example, chunks). Each storage block has a predetermined storage space (for example, 128 MB), which may store data blocks of a plurality of user objects. In order to guarantee high write performance, the storage block has been designed as an append-only/write-once data structure. A storage block could be reclaimed when the data that is stored on the storage block by all the objects is no longer used. When the storage block is reclaimed, reference counting is generally used to decide whether the storage block is reclaimed or not.

In the storage system, when the object is created, it will generate a positive reference between the storage block and object. When the object is deleted, it will generate a negative reference. For each storage block, the storage system will collect all the positive references and negative references. When all the positive references are counteracted by the negative references, the reference of the storage block becomes 0. At that point, the storage block is reclaimed.

However, in a distributed object storage system, the above approach is not reliable. In the distributed object storage system, there will be a positive reference when a new object is created on a storage unit and a negative reference when the object is deleted. For example, the user data of the first object, the second object and the third object have been written on the same storage block. To guarantee the parallelism of computing, the distributed storage system will introduce the conception of partition. The example assumes there are two partitions to handle the transaction of object creation/deletion, and collects the references. For example, the first partition is used to create and delete the first object, and records related transactions of the first object. The second object cannot be created, so its transactions cannot be recorded. The second partition is used to create the third object, and record the transactions of the third object.

Since the distributed storage system can only guarantee the order within the partitions, and cannot guarantee the order between different partitions. Assuming that the distributed storage system collects the positive reference of the first object, there are two cases: in the first case, it first collects the positive reference of the third object, and then collects the negative reference of the first object; in the second case, it first collects the negative reference of the first object, and then collects the positive references of the third object.

However, in the second case, all references are counteracted, which means that the storage block is reclaimable. There is no way for the distributed storage system or reference counting system to guarantee when the positive reference of third object could be collected. And the distributed storage system could not even know whether the positive reference of third object will come or not. Therefore, within this window, the reference counting result is unreliable. Such unreliable reference counting is critical to the storage system, because it will cause a potential data storage problem.

Therefore, in order to solve the above problem, after it is determined by reference that a storage block is reclaimable, it scans the entire object table to double check if there are any objects still referencing to the storage block.

However, the verification process for the scan is very time-consuming, and usually is the bottleneck affecting the storage block-reclaiming speed. For the customer, that means their resources are not used efficiently In order to solve the above problems, the present disclosure proposes a method of managing storage blocks. In this method, a set of write parameters and a set of deletion parameters related to a target storage block are first obtained. When the set of write parameters matches the set of deletion parameters, a first data length for the target storage block is obtained. Then, based on the first data length and the set of deletion parameters, the reclaim information related to the target storage block is determined. Through the above method, it is possible to determine whether the storage block is reclaimed by comparing the data lengths when determining that the set of write parameters matches the set of deletion parameters, which reduces the scan of the entire object table to determine whether there is an object referring to the storage block, thereby reducing the time consumed by the verification process, improving the reclaiming speed of storage blocks and improving resource utilization.

FIG. 1 illustrates a schematic diagram of a storage system 100 in which devices and/or methods according to embodiments of the present disclosure may be implemented. As shown in FIG. 1, the storage system 100 may include an object layer 110 and a storage block layer 120. The object layer 110 includes a first partition 111-1 and a second partition 111-2. The creation and deletion of objects in the first partition 111-1 are performed sequentially, and the creation and deletion of objects in the second partition 111-2 are performed sequentially. The creation and deletion of objects in the first partition 111-1 and the second partition 111-2 can be performed in parallel.

In some embodiments, the objects in the first partition 111-1 and the second partition 111-2 may be performed by different computing devices. In some embodiments, the objects of the first partition 111-1 and the second partition 111-2 may be executed by different processes. The above examples are only used to describe the present disclosure, but not to specifically limit the present disclosure.

The first partition 111-1 in FIG. 1 includes an object 112-1. The second partition 111-2 includes an object 112-2. The number of objects included in the partitions in FIG. 1 is only an example, and is not a specific limitation on the present disclosure. The partitions may include any number of objects as needed.

The data of object 112-1 is represented as 122, and the data of object 112-2 may be represented as data 123 and data 124. The storage block layer 120 for example may include a plurality of storage blocks 121-1 to 121-X, where X is a positive integer, and may be collectively referred to as the storage block 121 for convenience of description. As can be seen from FIG. 1, the data 122 of the object 112-1 is stored in the storage block 121-1, the data 123 of the object 112-2 is also stored in the storage block 121-1, whereas the data 124 of the object 112-2 is stored in the storage block 121-2. The data included in the object and the data included in the storage block 121 shown in FIG. 1 are merely examples, and do not specifically limit the present disclosure. Those skilled in the art may set the data included in the objects and the data stored in the storage blocks according to the needs.

Alternatively or additionally, the storage system 100 further includes a hardware layer which corresponds to the storage block layer 120 and may include storage media for storing data, for example, a plurality of data disks.

The storage system 100 shown in FIG. 1 also has metadata for the object 112-1 and the object 112-2. The metadata for the object 112-1 and the object 112-2 describe the size of the data of the object 112-1 and the object 112-2 and the identifier of storage block 121 that the data of the object 112-1 and the object 112-2 are stored. For example, the metadata for the object 112-1 and the object 112-2 includes an identifier of the storage block 121 where the data of the object 112-1 and object 112-2 lies, an offset address of the data in the storage block 121 and a length of data in the storage block 121. In some embodiments, the metadata of the object 112-1 and the object 112-2 is stored in the object table.

The storage system 100 shown in FIG. 1 has a set of write parameters and a set of deletion parameters for the storage block 121. The set of write parameters includes information related to data that is stored in the storage block 121 and associated with at least one object (for example, object 112-1, object 112-2), and the set of deletion parameters includes information related to data that is deleting from the target storage block and associated with at least one object.

In some embodiments, the set of write parameters employs a positive reference that includes an identifier of an object which stores data in the storage block 121, an offset of the data in the storage block 121 and a length of the data. Alternatively or additionally, the positive reference includes adding a positive sign before the above-mentioned data. The set of deletion parameters employs a negative reference that includes an identifier of an object which stores data in the storage block 121, and an offset of the data in the storage block 121 and a length of the data. Alternatively or additionally, the negative reference includes adding a negative sign before the above-mentioned data.

In some embodiments, the set of write parameters and the set of deletion parameters are stored in a reference table. When the storage system 100 checks whether to reclaim the storage block 121, it first checks the reference table. If the write parameter and the deletion parameter in the reference table for the storage block 121 match, for example, the positive reference and the negative reference are counteracted, then further verification is performed to determine whether to reclaim the storage block 121. If the write parameter and deletion parameter for the storage block 121 do not match, no further verification is required.

When the set of write parameters and the set of deletion parameters for the storage block 121 match, the secondary verification is performed. In order to reduce lookup in the objects to see whether there is an object still using the data in the storage block 121, the storage system 100 further sets a data length for the storage block in the metadata of the storage block 121.

In some embodiments, the data length is determined in response to receiving a write request for storage block 121. Usually the write request includes the length of the data to be written. When receiving the request, the storage system 100 adds up the data length with the previous historical data length of the storage block 121 to obtain a current data length.

Figure 2:
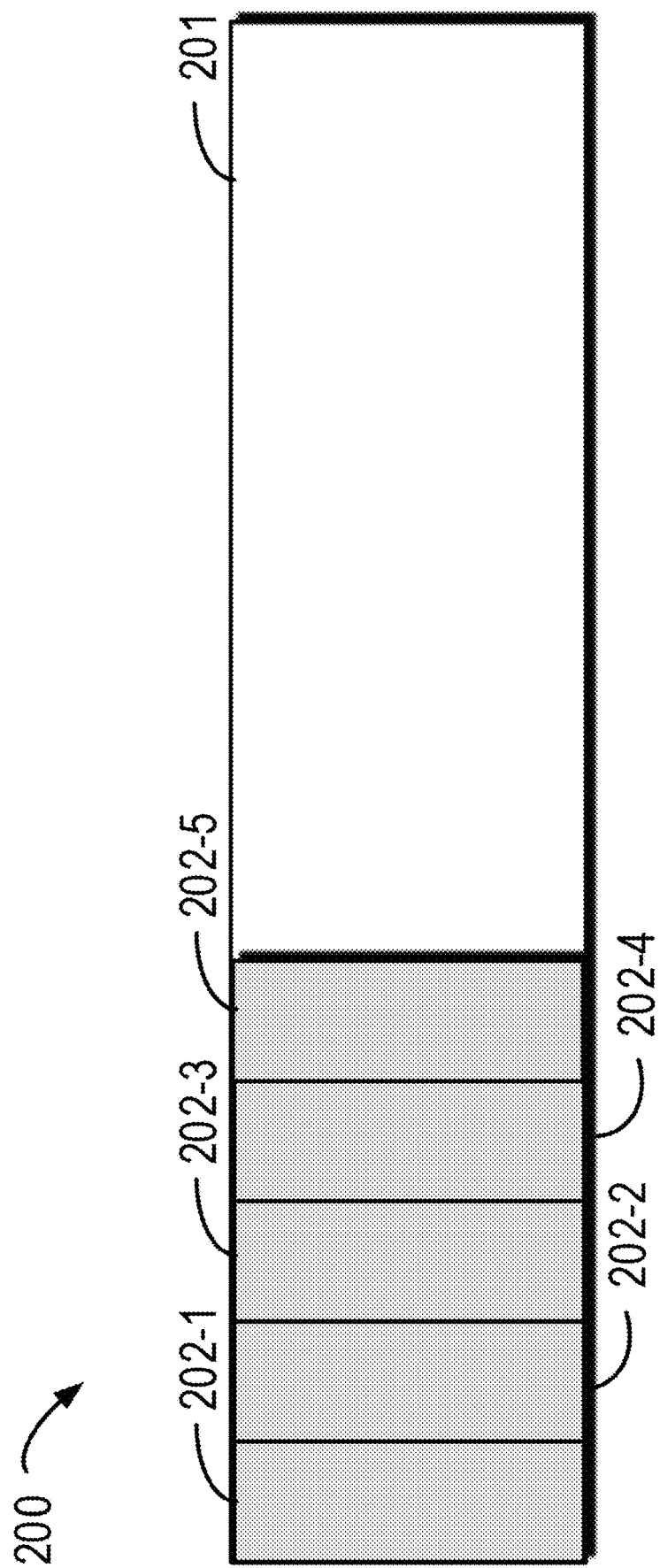
FIG. 2 illustrates a structural diagram 200 of storage blocks according to an embodiment of the present disclosure.

When performing secondary verification, the storage system 100 determines a sum of the data lengths associated with a plurality of objects in the set of deletion parameters, and then compares the current length of the data with the sum of the data lengths associated with the plurality of objects. If they are the same, this means that no object refers to the storage block 121, and the storage block 121 may be reclaimed. As shown in FIG. 2, the storage block 201 stores data 202-1, data 202-2, data 202-3, data 202-4 and data 202-5. If the objects related to the above data are deleted, the set of deletion parameters related to the above data is stored. The set of deletion parameters includes the length of data 202-1, the length of data 202-2, the length of data 202-3, and the length of data 202-4 and the length of data 202-5. When the above lengths are accumulated, if the accumulated length is equal to the current length of the storage block 201, this indicates that no object refers to the storage block 201. Therefore, the storage block 201 may be reclaimed.

If the length of the current data is greater than the accumulated length, it is necessary to determine whether there is an object referring to the storage block 201 by detecting the metadata of the object. If it is detected that the metadata of the object includes the identifier of the storage block 201, this indicates that there is still one or more objects referring to the storage block 201. The storage block 201 will not be reclaimed. If no identifier of an object is detected, this indicates that there is no object referring to the storage block 201. The storage block 201 will be reclaimed.

Figure 3:
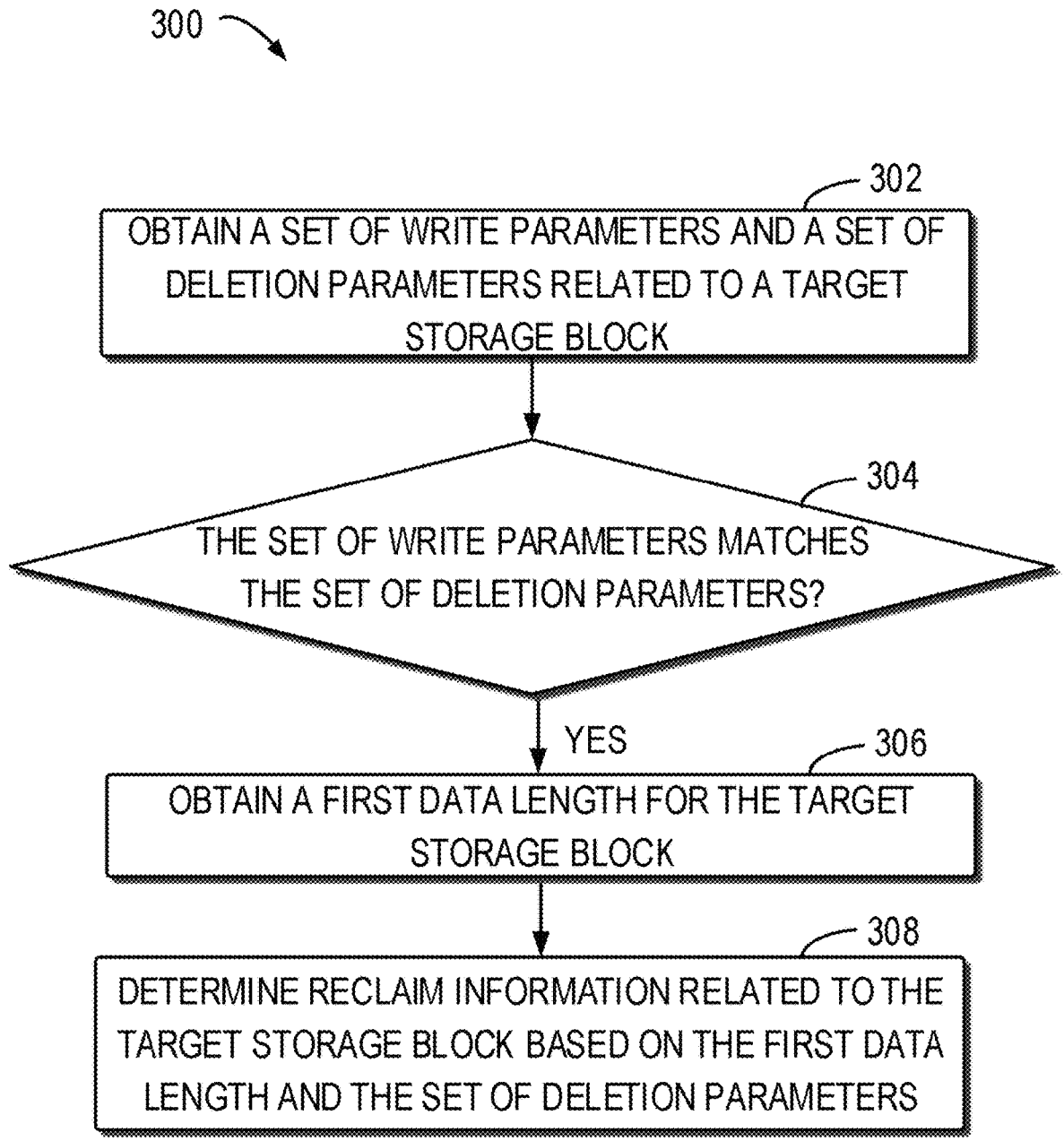
FIG. 3 illustrates a flowchart of a method 300 of managing storage blocks according to an embodiment of the present disclosure.

The schematic diagram of the storage system 100 for managing storage blocks according to embodiments of the present disclosure is described above with reference to FIGS. 1 and 2. Reference is made below to FIG. 3 to describe in detail a flowchart of an example method 300 for managing storage blocks according to an embodiment of the present disclosure. For example, the method 300 may be performed by the storage system 100 as shown in FIG. 1. Hereinafter, each action of the method 300 will be described in detail with reference to FIG. 1. It should be understood that the method 300 may further include additional actions not shown and/or the actions shown may be omitted. The scope of the present disclosure is not limited in this regard.

At block 302, the storage system 100 obtains a set of write parameters and a set of deletion parameters related to the target storage block. The set of write parameters includes information related to data that is stored in the target storage block and associated with at least one object. The set of deletion parameters includes information related to data that is deleted from the target storage block and associated with the at least one object.

In some embodiments, the storage system 100 has metadata for the target storage block, and the metadata stores the set of write parameters and the set of deletion parameters. The metadata of the target storage block is obtained. After obtaining the metadata of the target storage block, the storage system 100 extracts the set of write parameters and the set of deletion parameters from the metadata. Alternatively or additionally, the set of write parameters and the set of deletion parameters for the target storage block are included in a reference table for the target storage block.

At block 304, the storage system 100 determines whether the set of write parameters matches the set of deletion parameters. If the set of write parameters matches the set of deletion parameters, at block 306, the storage system 100 obtains a first data length for the target storage block, the first data length being determined in response to receiving a write request for the target storage block.

In some embodiments, upon obtaining the first data length, the storage system 100 first obtains metadata of the target storage block. Then, the storage system 100 extracts a second data length from the metadata. The second data length is calculated based on the data length in the received previous write request. Upon receiving the write request for the target storage block, the storage system 100 determines the data length of the data that is related to the write request and is written to the target storage block. The storage system 100 then determines the first data length based on the second data length and the data length for writing into the target storage block.

Alternatively or additionally, the storage system 100 updates the metadata of the target storage block with the first data length.

At block 308, the storage system 100 determines reclaim information about the target storage block based on the first data length and the set of deletion parameters. The process of determining the reclaim information will be described in detail below with reference to FIG. 4.

Through the above method, it is possible to determine whether the storage block is reclaimed by comparing the data lengths when determining that the set of write parameters matches the set of deletion parameters, which reduces the scan of the entire object table to determine whether there is an object referring to the storage block, thereby reducing the time consumed by the verification process, improving the reclaim speed of storage blocks and improving resource utilization.

Figure 4:
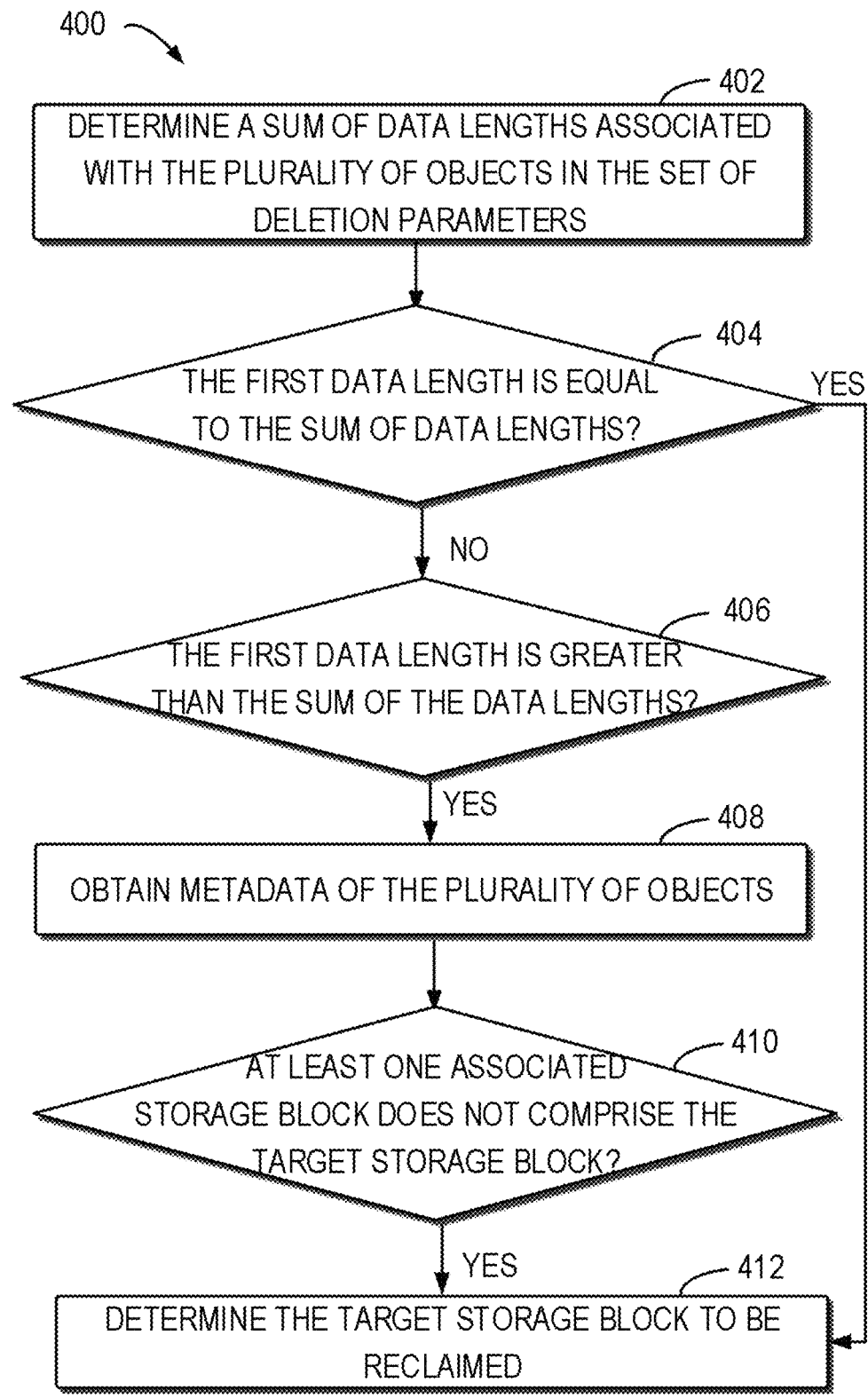
FIG. 4 illustrates a flowchart of a method 400 for determining reclaim information according to an embodiment of the present disclosure.

The flowchart of the method 300 for managing storage blocks according to an embodiment of the present disclosure is described above with reference to FIG. 3. Reference is made below to FIG. 4 to describe in detail a process of determining the reclaim information at block 308 of FIG. 3. FIG. 4 illustrates a flowchart of a method 400 for determining reclaim information according to an embodiment of the present disclosure In the storage system 100, a plurality of objects (for example, the object 112-1 and the object 112-2) store data in the target storage block. Upon determining the reclaim information about the target storage block, at block 402, the storage system 100 determines a sum of the data lengths associated with the plurality of objects in the set of deletion parameters.

The storage system 100 obtains the data length in each deletion parameter of the set of deletion parameters, and then adds up the obtained lengths to obtain the sum of the data lengths.

At block 404, the storage system 100 determines whether the first data length is equal to the sum of the data lengths. When the first data length is equal to the sum of the data lengths, at block 412, the storage system 100 determines the target storage block to be reclaimed.

Upon determining that the first data length is not equal to the sum of data lengths, at block 406, the storage system 100 determines whether the first data length is greater than the sum of data lengths. Upon determining that the first data length is greater than the sum of the data lengths, at block 408, the storage system 100 obtains metadata of a plurality of objects (for example, object 112-1, object 112-2), where the metadata includes an identifier of at least one associated storage block of each object. Since the first data length is greater than the data length, this indicates that after the write request is received, there may be an object which is writing data in the target storage block, but its write parameters have not been generated. Therefore, it is necessary to scan the metadata of the object to determine whether there is an object that is writing data.

At block 410, the storage system 100 determines whether the at least one associated storage block does not include the target storage block. Upon determining that at least one associated storage block does not include the target storage block, at block 412, the storage system 100 determines the target storage block to be reclaimed. At this time, this indicates that there is no object using the target storage block. Therefore, the target storage block may be reclaimed.

The difference between the first data length and the sum of the data lengths is because the write request of the object is received, but the object is not successfully created. If the at least one associated storage block includes the target storage block, this indicates that an object that uses the target storage block is being created. Therefore, the storage block cannot be reclaimed.

Through the above method, it is possible to quickly implement verification of partial storage blocks by comprising data lengths upon determining that the sets of write parameters matches the set of deletion parameters, which improves the verification efficiency of the storage blocks, accelerates the reclaim of the storage blocks, and improves resource utilization.

Figure 5:
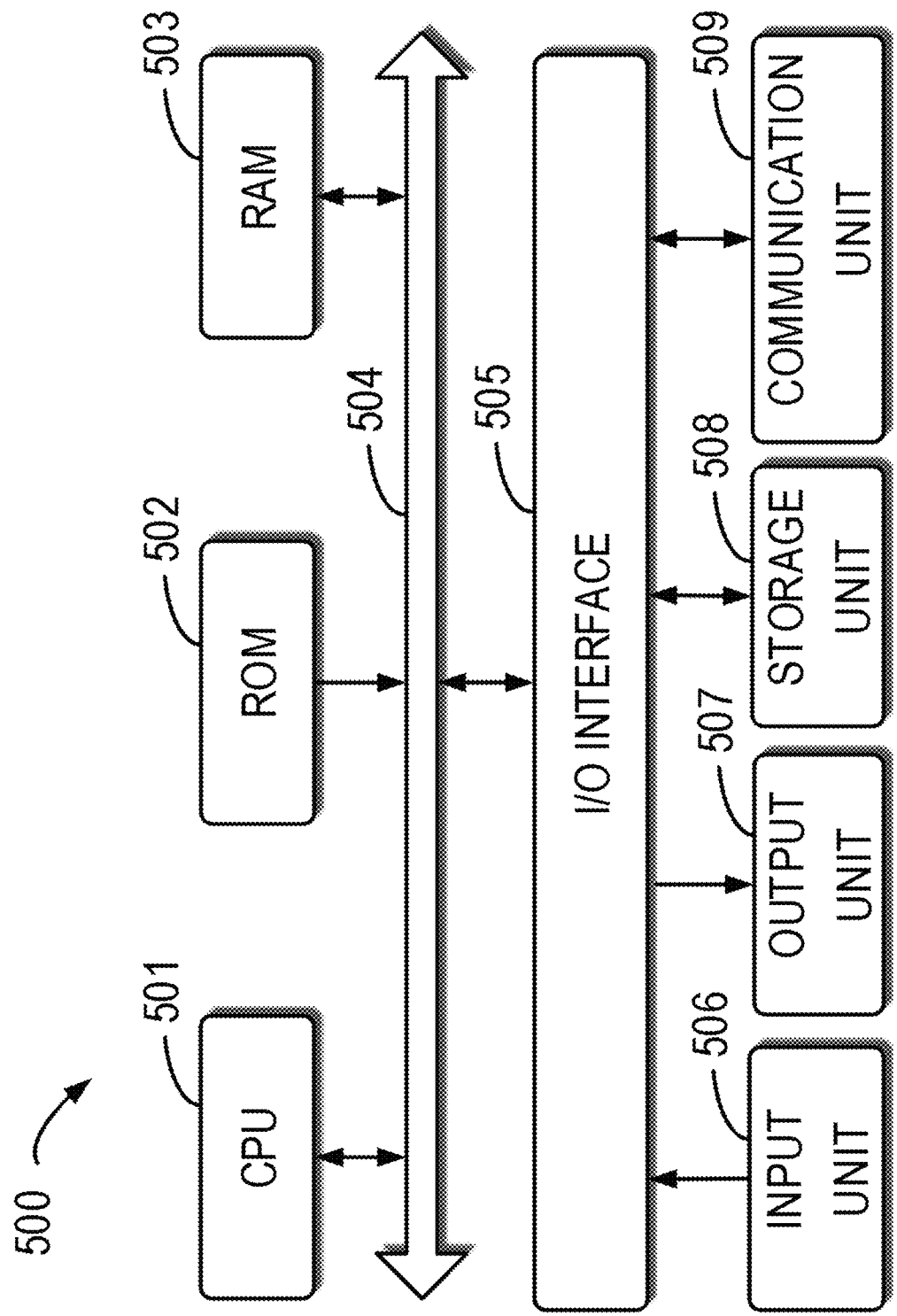
FIG. 5 illustrates a schematic block diagram of an example device 500 adapted to implement an embodiment of the present disclosure.

FIG. 5 illustrates a schematic block diagram of an exemplary device 500 that may be used to implement an embodiment of the content of the present disclosure. For example, the storage system 100 shown in FIG. 1 may be implemented by the device 500. As shown, the device 500 includes a central processing unit (CPU) 501 which is capable of performing various proper actions and processes in accordance with a computer program instruction stored in a read only memory (ROM) 502 or a computer program instruction loaded from a storage unit 508 to a random access memory (RAM) 503. Various programs and data needed in the operation of the device 500 may also be stored in the RAM 503. The CPU 501, the ROM 502 and the RAM 503 are connected to one another via a bus 504. An input/output (I/O) interface 505 is also connected to the bus 504.

The following components in the device 500 are connected to the I/O interface 505: an input unit 506 including a keyboard, a mouse, or the like; an output unit 507, e.g., various displays and loudspeakers; a storage unit 508 such as a magnetic disk, an optical disk or the like; and a communication unit 509 such as a network card, a modem, a radio communication transceiver. The communication unit 509 allows the device 500 to exchange information/data with other devices via a computer network such as Internet and/or various telecommunication networks.

The above-described procedures and processes such as methods 300 and 400 may be implemented by the processing unit 501. For example, in some embodiments, the methods 300 and 400 may be implemented as a computer software program, which is tangibly included in a machine-readable medium such as the storage unit 508. In some embodiments, part or all of the computer program may be loaded and/or installed on the device 500 via the ROM 502 and/or the communication unit 509. When the computer program is uploaded to the RAM 503 and executed by the CPU 501, one or more acts of the above methods 300 and 400 may be implemented.

The present disclosure may be a method, a device, a system and/or a computer program product. The computer program product may include a computer readable storage medium (or media) having computer readable program instructions thereon for carrying out aspects of the present disclosure.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processing unit of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing storage blocks, comprising:
   obtaining, by a system comprising a processor, a set of write parameters and a set of deletion parameters related to a target storage block, the set of write parameters comprising information related to first data that is stored in the target storage block and associated with at least one object, and the set of deletion parameters comprising information related to second data that is deleted from the target storage block and associated with the at least one object;

in response to the set of write parameters matching the set of deletion parameters, obtaining a first data length for the target storage block, the first data length being determined in response to receiving a write request for the target storage block; and determining reclaim information related to the target storage block based on the first data length and the set of deletion parameters.

2. The method of claim 1, wherein the at least one object comprises a plurality of objects, and the determining the reclaim information related to the target storage block comprises:

determining a sum of data lengths associated with the plurality of objects in the set of deletion parameters; and in response to determining that the first data length is equal to the sum of data lengths, determining the target storage block to be reclaimed.

3. The method of claim 2, wherein the determining the reclaim information related to the target storage block further comprises:

in response to determining that the first data length is greater than the sum of the data lengths, obtaining metadata of the plurality of objects, the metadata comprising an identifier of at least one associated storage block for each object; and in response to determining that the at least one associated storage block does not comprise the target storage block, determining the target storage block to be reclaimed.

4. The method of claim 1, wherein the obtaining the set of write parameters and the set of deletion parameters comprises:

obtaining metadata of the target storage block; and
extracting the set of write parameters and the set of deletion parameters from the metadata.

5. The method of claim 1, wherein the obtaining the first data length comprises:

obtaining metadata of the target storage block;
extracting a second data length from the metadata, the second data length being calculated based on a data length in a received previous write request;

in response to receiving the write request for the target storage block, determining a data length for writing to the target storage block; and determining the first data length based on the second data length and the data length for writing to the target storage block.

6. The method of claim 5, further comprising:
updating the metadata of the target storage block with the first data length.

7. An electronic device comprising:
a processor; and
a memory having computer program instructions stored thereon, the processor executing the computer program instructions in the memory to control the electronic device to perform acts comprising:

obtaining a set of write parameters and a set of deletion parameters related to a target storage block, the set of write parameters comprising information related to first data that is stored in the target storage block and associated with at least one object, and the set of deletion parameters comprising information related to second data that is deleted from the target storage block and associated with the at least one object;

in response to the set of write parameters matching the set of deletion parameters, obtaining a first data length for the target storage block, the first data length being determined in response to receiving a write request for the target storage block; and determining reclaim information related to the target storage block based on the first data length and the set of deletion parameters.

8. The electronic device of claim 7, wherein the at least one object comprises a plurality of objects, and the determining reclaim information related to the target storage block comprises:

determining a sum of data lengths associated with the plurality of objects in the set of deletion parameters; and in response to determining that the first data length is equal to the sum of data lengths, determining the target storage block to be reclaimed.

9. The electronic device of claim 8, wherein the determining the reclaim information related to the target storage block further comprises:

in response to determining that the first data length is greater than the sum of the data lengths, obtaining metadata of the plurality of objects, the metadata comprising an identifier of at least one associated storage block for each object; and in response to determining that the at least one associated storage block does not comprise the target storage block, determining the target storage block to be reclaimed.

10. The electronic device of claim 7, wherein the obtaining the set of write parameters and the set of deletion parameters comprises:

obtaining metadata of the target storage block; and
extracting the set of write parameters and the set of deletion parameters from the metadata.

11. The electronic device of claim 7, wherein the obtaining the first data length comprises:

obtaining metadata of the target storage block;
extracting a second data length from the metadata, the second data length being calculated based on a data length in a received previous write request;

in response to receiving a write request for the target storage block, determining a data length for writing to the target storage block; and determining the first data length based on the second data length and the data length for writing to the target storage block.

12. The electronic device of claim 11, the acts further comprising:

updating the metadata of the target storage block with the first data length.

13. A computer program product being tangibly stored on a non-volatile computer-readable medium and comprising machine-executable instructions which, when executed, cause a machine to perform operations, comprising:

obtaining write parameters and deletion parameters related to a target storage block, the write parameters comprising information related to first data that is stored in the target storage block and associated with at least one object, and the deletion parameters comprising information related to second data that is deleted from the target storage block and associated with the at least one object;

in response to the write parameters matching the deletion parameters, obtaining a first data length for the target storage block, the first data length being determined in response to receiving a write request for the target storage block; and determining reclaim information related to the target storage block based on the first data length and the deletion parameters.

14. The computer program product of claim 13, wherein the at least one object comprises objects, and the determining the reclaim information related to the target storage block comprises:

determining a sum of data lengths associated with the objects in the deletion parameters.

15. The computer program product of claim 14, wherein the determining the reclaim information related to the target storage block further comprises:

in response to determining that the first data length is equal to the sum of data lengths, determining the target storage block to be reclaimed.

16. The computer program product of claim 15, wherein the determining the reclaim information related to the target storage block further comprises:

in response to determining that the first data length is greater than the sum of the data lengths, obtaining metadata of the objects, the metadata comprising an identifier of at least one associated storage block for each object; and in response to determining that the at least one associated storage block does not comprise the target storage block, determining the target storage block to be reclaimed.

17. The computer program product of claim 13, wherein the obtaining the write parameters and the deletion parameters comprises:

obtaining metadata of the target storage block.

18. The computer program product of claim 17, wherein the obtaining the write parameters and the deletion parameters further comprises:

extracting the write parameters and the deletion parameters from the metadata.

19. The computer program product of claim 13, wherein the obtaining the first data length comprises:

obtaining metadata of the target storage block;

extracting a second data length from the metadata, the second data length being calculated based on a data length in a received previous write request;

in response to receiving the write request for the target storage block, determining a data length for writing to the target storage block; and determining the first data length based on the second data length and the data length for writing to the target storage block.

20. The computer program product of claim 19, wherein the operations further comprise:

updating the metadata of the target storage block with the first data length.

* * * * *